No. 818,127. PATENTED APR. 17, 1906.
P. F. SMITH, Jr.
SPREADER CAR.
APPLICATION FILED DEC. 19, 1904.

2 SHEETS—SHEET 1.

WITNESSES:

INVENTOR.
BY
ATTORNEY.

No. 818,127. PATENTED APR. 17, 1906.
P. F. SMITH, Jr.
SPREADER CAR.
APPLICATION FILED DEC. 19, 1904.
2 SHEETS—SHEET 2.
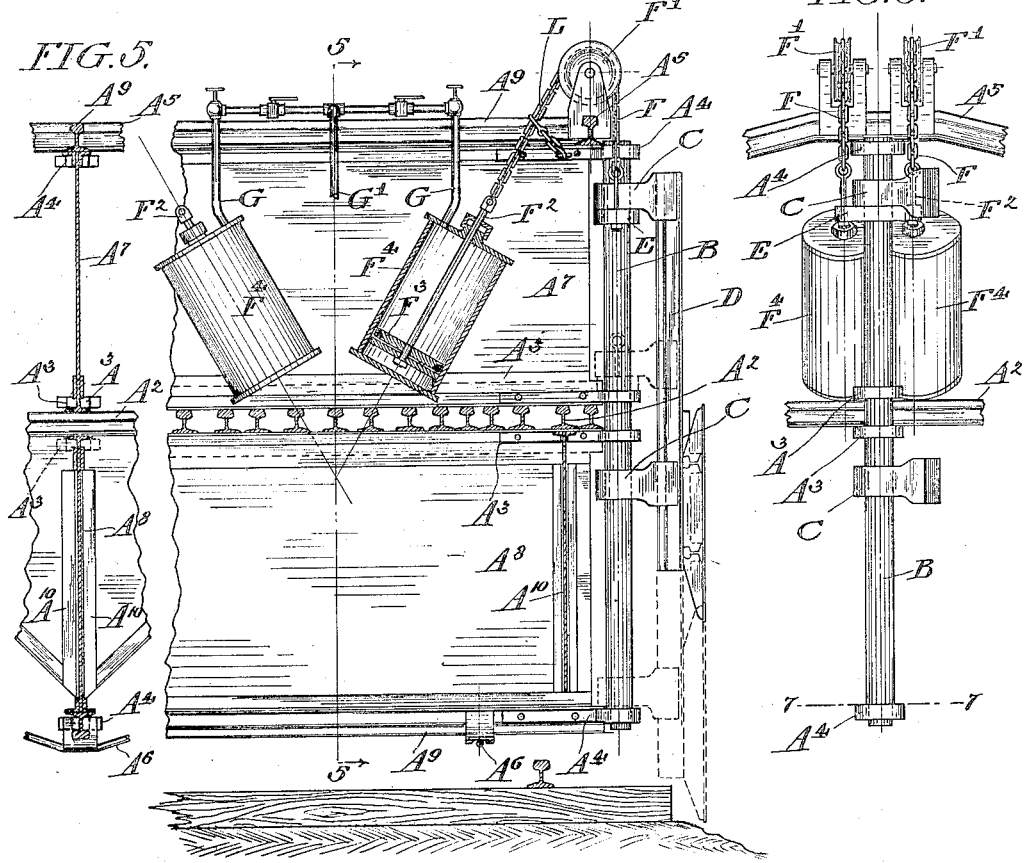
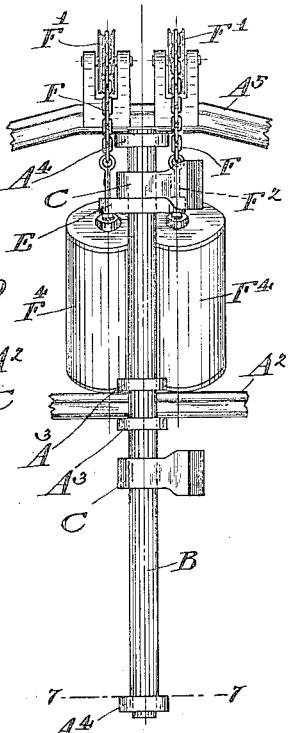
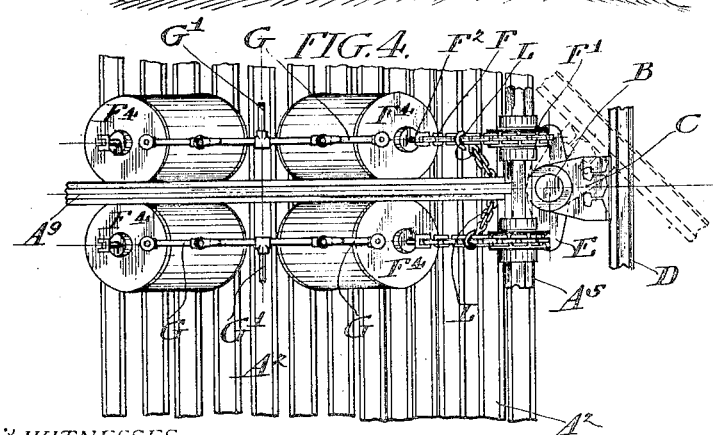
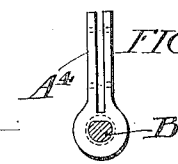
WITNESSES:
INVENTOR.
BY
ATTORNEY.

UNITED STATES PATENT OFFICE.

PERSIFOR F. SMITH, JR., OF DENNISON, OHIO.

SPREADER-CAR.

No. 818,127.

Specification of Letters Patent.

Patented April 17, 1906.

Application filed December 19, 1904. Serial No. 237,403.

*To all whom it may concern:*

Be it known that I, PERSIFOR F. SMITH, Jr., a citizen of the United States of America, residing in Dennison, in the county of Tuscarawas, in the State of Ohio, have invented a certain new and useful Improvement in Spreader-Cars, of which the following is a true and exact description, reference being had to the accompanying drawings, which form a part thereof.

My invention relates to what are known as "spreader-cars," and has for its object to provide an improved car of this kind mainly characterized by a construction by which the spreader-plate is secured to vertical standards supported by the car-body through hinges which permit both the vertical and angular adjustment of the plate.

Figure 1:
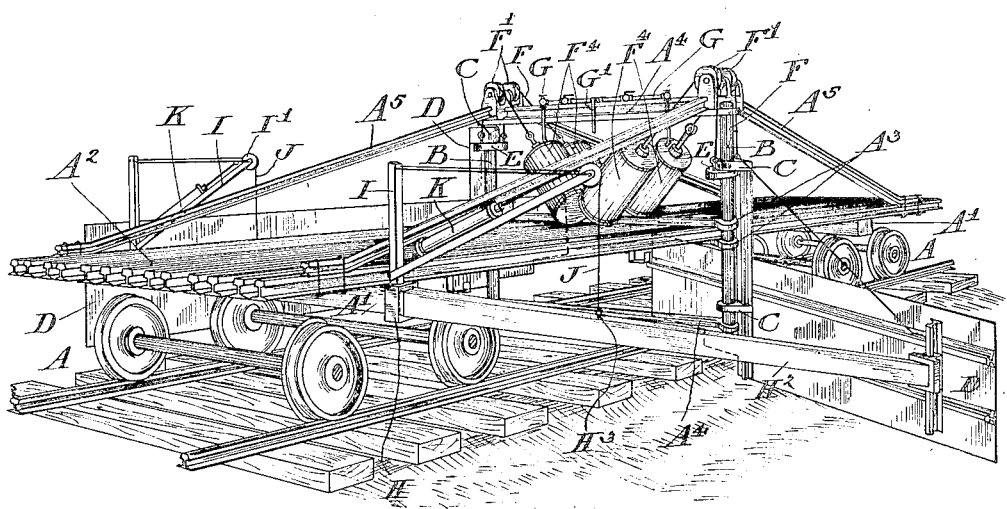
Figure 2:
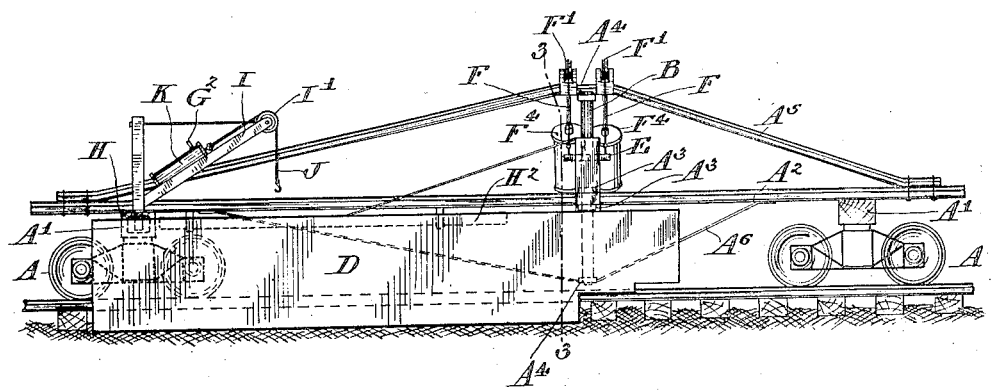

Reference being had to the drawings which illustrate my invention, Figure 1 is a perspective view of a spreader-car having my improved construction, but with certain of the transverse bracing-plates removed. Fig. 2 is a side elevation of this car; Fig. 3, a cross-section through the car, taken approximately on the line 3 3 of Fig. 2, but with the spreader-plate shown in elevated position and one of the actuating-cylinders shown in section. Fig. 4 is a plan view of the center of the car-body and the mechanism and structure secured thereto. Fig. 5 is a sectional view taken as on the line 5 5 of Fig. 3. Fig. 6 is an end view of the structure shown in Fig. 3, and Fig. 7 is a sectional view taken on the line 7 7 of Fig. 6.

A A are the trucks of the spreader-car, and A' A' the bolsters on which rests the platform A$^2$, made up, as shown, of rails.

B B are standards secured in a vertical position on each side of the center of the car and, as shown, secured together by two eye-bars A$^3$ A$^3$, one running immediately above and the other immediately below the rails forming the floor A$^2$ of the car, and two eye-bars A$^4$ A$^4$, secured near the tops and bottoms of the standards, as shown. By preference these eyebars are slotted, as shown in Fig. 7, so that the two girder-plates A$^7$ and A$^8$ may fit in them, as shown in Figs. 3 and 5, rail-sections A$^9$ A$^9$ being bolted down on the top and bottom edges of the plates, as also shown in Figs. 3 and 5. The central members or girders, built up as above explained, are braced and held in position by the struts A$^5$, preferably formed, as shown, of bent rail-sections, and the ties A$^6$. As shown, the lower plate A$^8$ is further braced and stiffened by angle-irons A$^{10}$, secured to it, as shown in Figs. 3 and 5.

C C are hinges adapted to turn on and also to move vertically upon the standards B B. These hinges are secured to the spreader-plates D D, as shown, and under the uppermost of the hinges C C is placed the perforated lug E, which, through chains F F, moving over pulleys F' F', is connected to the piston-rods F$^2$ of pistons F$^3$, moving in cylinders F$^4$, into the upper ends of which lead the air-pipes G G, connecting with some common source of air-supply, such as the pipe G'.

H, Fig. 1, is a socket secured to the body of the car, and H' a similar socket secured to the spreader-plate, as shown, H$^2$ being a strut or beam which when the spreader-plate is in operative position is secured in place, as shown in Fig. 1, to hold the spreader-plate extended. This beam or stut is preferably provided with an eye, as indicated at H$^3$, and my car is provided with cranes I I, supporting at their outer ends grooved pulleys I' and carrying pneumatic cylinders K, fed by compressed-air pipes, as indicated at G$^2$, and arranged to actuate chains J, which chains can be coupled to the eyes H$^3$ and used to manipulate the beam H$^2$ when it is desired either to retract it from operative position or to place it in operative position. When retracted, the beams or struts can be carried on the side of the car, as indicated in Fig. 2.

L (see Figs. 3 and 4) indicates shackles or locks which by engaging the chains F are used to lock the spreader-plate in any desired vertical position. For transport the spreader-plate is folded back against the side of the car, as shown in Fig. 2, and raised to any height which may be deemed advisable.

In operation the spreader-plate is dropped to, for instance, the position shown in dotted lines in Fig. 3 or such position as may be deemed useful, and it is then turned outward, as shown in Fig. 1, and secured in place by the strut H$^2$.

Having now described my invention, what I claim as new, and desire to secure by Letters Patent, is—

1. A spreader-car having in combination one or more vertical standards B forming struts of a diamond truss secured at its ends to the body of the car, a spreader-plate pivotally and slidingly secured to said standard, and means for raising or lowering said spreader-plate and securing it in position.

2. A spreader-car having in combination two vertical standards B forming struts of two diamond trusses secured at their ends to the body of the car, transverse beams connecting said standards together at top and bottom, spreader-plates pivotally and slidingly secured to said standards and means for raising or lowering said spreader-plates and securing them in position.

3. A spreader-car having two trucks and vertical standards secured to the car-body at an intermediate point in combination with a spreader plate or plates pivotally and slidingly secured to said standards, means for raising and lowering said plates, a removable strut for holding the spreader-plate in extended position, a strut-socket on the bolster of a truck and a strut-socket on the spreader-blade.

4. A spreader-car having two trucks and vertical standards secured to the car-body at an intermediate point in combination with a spreader plate or plates pivotally and slidingly secured to said standards, means for raising and lowering said plates, a removable strut for holding the spreader-plate in extended position, a strut-socket on the bolster of a truck, a strut-socket on the spreader-blade and a hoist on the car-body arranged to handle the strut.

PERSIFOR F. SMITH, JR.

Witnesses:
W. V. YOUNG,
H. M. WEY.